(12) United States Patent
Aerts et al.

(10) Patent No.: US 9,590,445 B2
(45) Date of Patent: Mar. 7, 2017

(54) APPARATUS FOR TRANSFERRING ENERGY TO AN ACCUMULATOR AND SYSTEM FOR CHARGING AN ELECTRIC ACCUMULATOR

(75) Inventors: Steven Aerts, Oud-Heverlee (BE); Steven Mark Thoen, Leuven (BE); Steven Daenen, Sint-Joris-Weert (BE)

(73) Assignee: NXP B.V., Eindhoven (NL)

( * ) Notice: Subject to any disclaimer, the term of this patent is extended or adjusted under 35 U.S.C. 154(b) by 1257 days.

(21) Appl. No.: 13/082,201

(22) Filed: Apr. 7, 2011

(65) Prior Publication Data

US 2011/0248673 A1  Oct. 13, 2011

(30) Foreign Application Priority Data

Apr. 9, 2010 (EP) ..................... 10159551
Aug. 16, 2010 (EP) ..................... 10172981

(51) Int. Cl.
*H02J 7/00* (2006.01)
*H01F 17/04* (2006.01)
*H01F 27/28* (2006.01)
*H01F 27/42* (2006.01)
*H02J 7/02* (2016.01)

(52) U.S. Cl.
CPC ............ *H02J 7/025* (2013.01); *H02J 7/0044* (2013.01)

(58) Field of Classification Search
USPC .............. 320/108, 107, 115; 336/221, 229; 307/104
See application file for complete search history.

(56) References Cited

U.S. PATENT DOCUMENTS

| 3,493,695 | A |   | 2/1970  | Stork            |          |
|-----------|---|---|---------|------------------|----------|
| 3,840,795 | A |   | 10/1974 | Roszyk et al.    |          |
| 4,031,449 | A | * | 6/1977  | Trombly          | 320/108  |
| 4,379,988 | A | * | 4/1983  | Mattatall        | H02J 7/022 |
|           |   |   |         |                  | 320/108  |
| 5,279,292 | A |   | 1/1994  | Baumann et al.   |          |
| 5,327,065 | A | * | 7/1994  | Bruni et al.     | 320/108  |
| 5,343,532 | A | * | 8/1994  | Shugart, III     | 381/315  |

(Continued)

FOREIGN PATENT DOCUMENTS

| DE | 298 16 725 U1 | 2/1999 |
| EP | 0 499 939 A1  | 8/1992 |

(Continued)

OTHER PUBLICATIONS

Extended European Search Report for European Patent Appln. No. 10159551.0 (Oct. 25, 2010).

*Primary Examiner* — Richard Isla Rodas
*Assistant Examiner* — Michael Dibenedetto

(57) ABSTRACT

It is provided an apparatus for transferring energy to an accumulator, the apparatus having a core and a wire wound around the core thereby forming a coil, wherein the coil is adapted to receive energy from a magnetic field, wherein the wire is connectable to the accumulator to transfer the received energy to the accumulator. A charging station for generating a magnetic field for transferring energy to an accumulator is provided, and a system for charging an electric accumulator is provided, wherein the system includes an apparatus as described above; and a charging station having a further wire wound such as to form a further coil.

14 Claims, 9 Drawing Sheets

(56) References Cited

U.S. PATENT DOCUMENTS

| | | | |
|---|---|---|---|
| 5,680,028 A * | 10/1997 | McEachern | A61C 17/22 |
| | | | 320/108 |
| 6,028,413 A * | 2/2000 | Brockmann | 320/108 |
| 6,057,668 A * | 5/2000 | Chao | H02J 7/025 |
| | | | 320/108 |
| 6,265,100 B1 * | 7/2001 | Saaski et al. | 429/163 |
| 6,498,455 B2 * | 12/2002 | Zink | H01M 10/46 |
| | | | 320/107 |
| 6,658,124 B1 * | 12/2003 | Meadows | 381/323 |
| 6,906,495 B2 * | 6/2005 | Cheng et al. | 320/108 |
| 7,211,986 B1 * | 5/2007 | Flowerdew et al. | 320/108 |
| 8,111,042 B2 * | 2/2012 | Bennett | 320/108 |
| 8,212,520 B2 * | 7/2012 | Takada et al. | 320/108 |
| 8,224,007 B2 * | 7/2012 | Petersen et al. | 381/323 |
| 8,237,402 B2 * | 8/2012 | Julstrom et al. | 320/108 |
| 2002/0113572 A1 | 8/2002 | Zink et al. | |
| 2006/0108974 A1 | 5/2006 | Castillo | |
| 2010/0109445 A1 * | 5/2010 | Kurs | B60L 11/007 |
| | | | 307/104 |
| 2010/0188041 A1 * | 7/2010 | Mizuo | H02J 7/025 |
| | | | 320/108 |
| 2010/0222010 A1 * | 9/2010 | Ozaki et al. | 455/77 |
| 2010/0277120 A1 | 11/2010 | Cook et al. | |
| 2011/0121777 A1 | 5/2011 | Carbunaru et al. | |

FOREIGN PATENT DOCUMENTS

| | | |
|---|---|---|
| EP | 1 962 557 A2 | 8/2008 |
| WO | 2009/100981 A1 | 8/2009 |
| WO | 2009/105595 A2 | 8/2009 |
| WO | WO 2009100981 A1 * | 8/2009 |

* cited by examiner

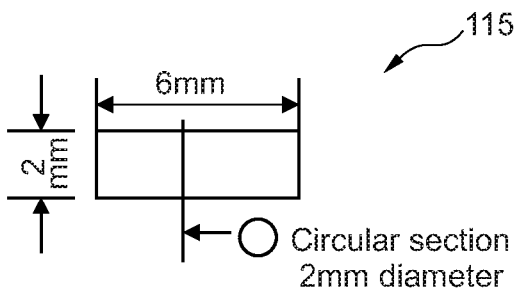
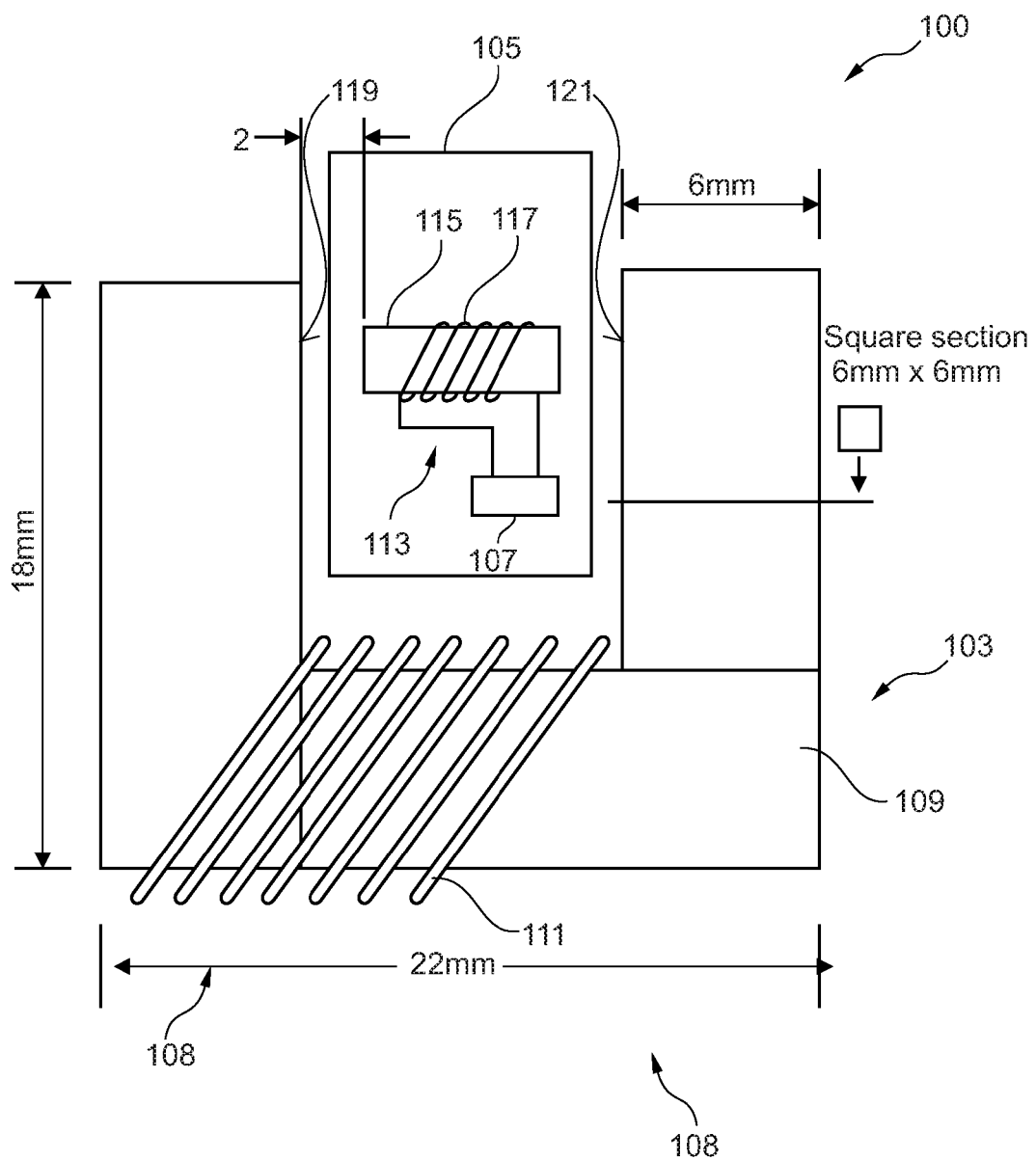
Fig. 1B
Fig. 1A

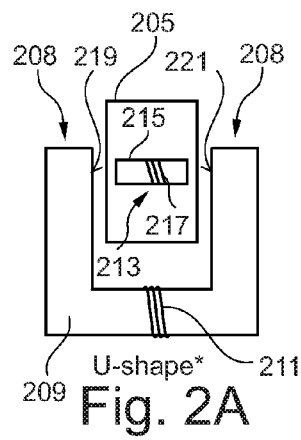
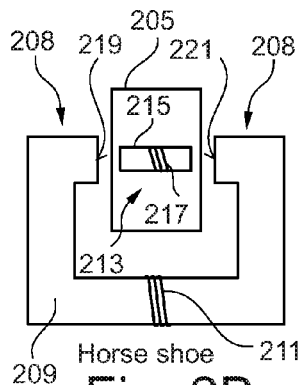
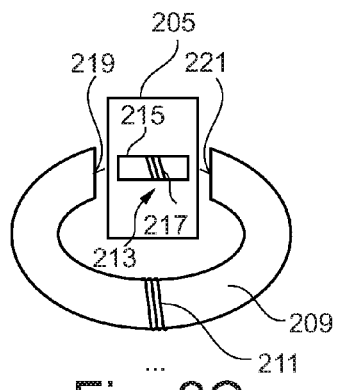
Fig. 2A  Fig. 2B  Fig. 2C
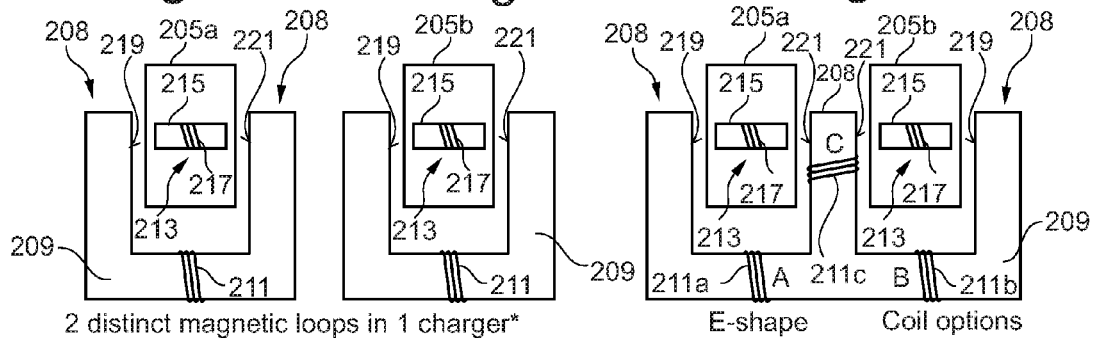
Fig. 2D  Fig. 2E
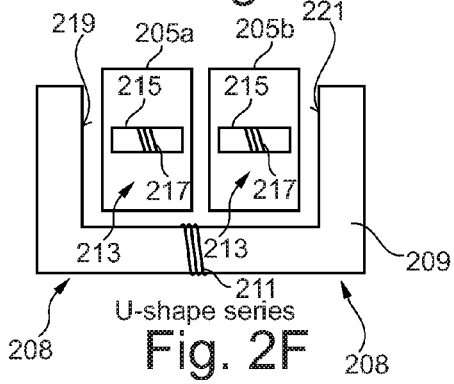
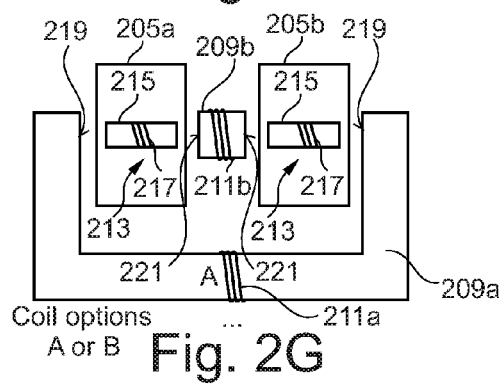
Fig. 2F  Fig. 2G
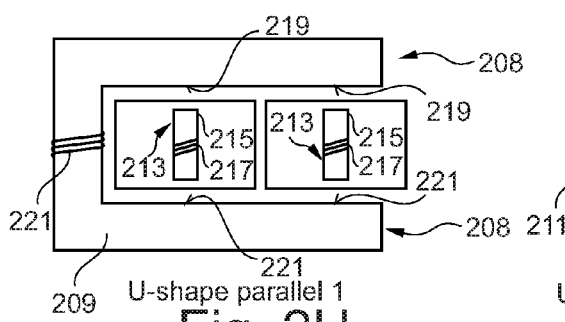
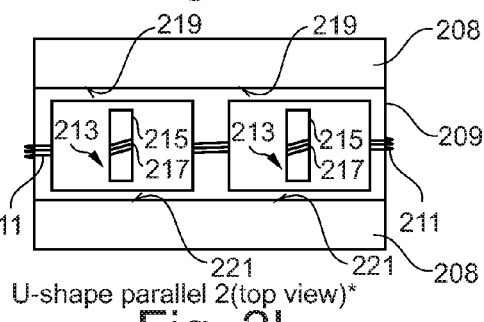
Fig. 2H  Fig. 2I

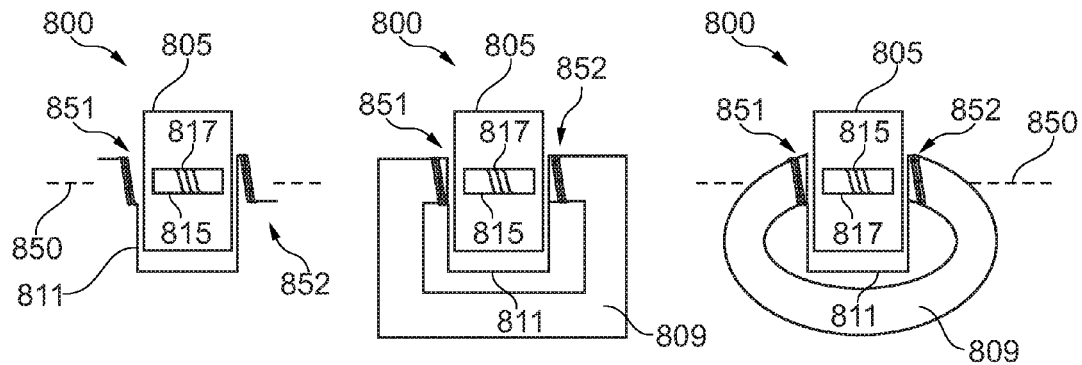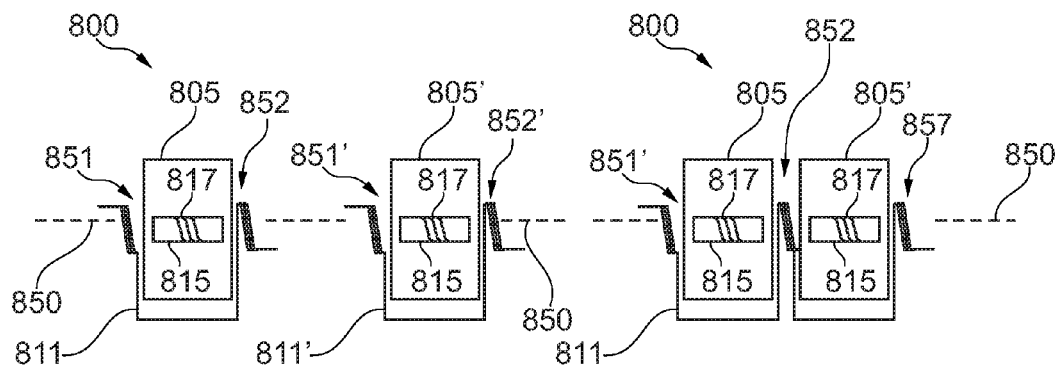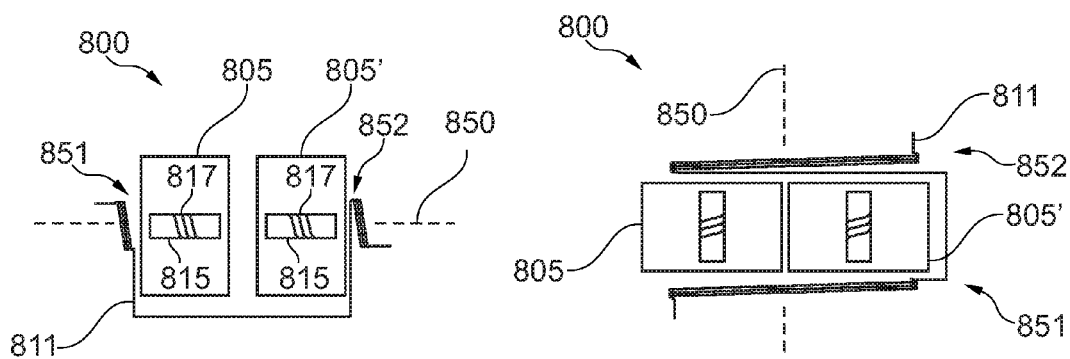

APPARATUS FOR TRANSFERRING ENERGY TO AN ACCUMULATOR AND SYSTEM FOR CHARGING AN ELECTRIC ACCUMULATOR

FIELD OF THE INVENTION

The present invention relates to an apparatus for transferring energy to an electric accumulator, to a system for charging an electric accumulator and to a method for transferring energy to an accumulator. In particular, the present invention relates to an apparatus for transferring energy to an accumulator comprised in a hearing instrument. Further in particular, the present invention relates to a system for charging an electric accumulator comprised in a hearing instrument.

Proposed is an inductive coupling system for wireless (contactless) charging of a rechargeable hearing instrument, comprising a charger having a primary coil characterized by a U-shaped primary ferrite core, and a hearing instrument device having a secondary coil with a ferrite rod core.

Said secondary coil may be connected to a battery charging subsystem as well as to a short-range communications subsystem.

BACKGROUND OF THE INVENTION

A hearing instrument or hearing aid is a device for amplification of sound or acoustic (audio) signals. A hearing aid may be worn at or behind an ear of a person having compromised hearing capabilities. The amplification of the acoustic signals may be performed by an electronic circuit requiring electric energy. The electric energy may be taken from a battery or an accumulator comprised in the hearing aid. Depending on a usage of the hearing aid the energy in the battery or the accumulator may be reduced over time requiring to either replace the empty battery with a charged battery or to charge the accumulator. Nowadays, the majority of hearing instruments or hearing aids in the market still have batteries which are not rechargeable and which have to be replaced weekly or biweekly. In particular, for elder people replacement of the often tiny batteries is difficult, since the elder people often are not very skilled to handle tiny batteries. Further, the battery door occupies space in the hearing aid which may limit miniaturization and may limit also battery capacity.

Alternatively, when the hearing aid is equipped with a rechargeable battery or accumulator, the accumulator is typically taken out of the hearing aid presenting essentially similar problems as known rechargeable batteries.

U.S. Pat. No. 4,379,988 discloses a moulded hearing aid and battery charger, wherein the hearing aid comprising an accumulator may be placed into a cup having a wire wound around the cup for charging the accumulator of the hearing aid.

US 2002/0113572 A1 discloses a wireless battery charging system for existing hearing aids, wherein a dynamic battery comprising a battery component and an inductor component may be placed close to a coil of a charging station for charging the battery component. The dynamic battery essentially comprises a battery component and an inductor component formed by a wire wound around the battery component and further comprising an electronic circuit.

The solutions known from the prior art for transferring energy to a hearing aid or generally for transferring energy to an accumulator are often not easily integrated in miniaturized hearing instruments and often do not have capabilities for effectively charging the accumulator.

There may be a need for an apparatus for transferring energy to an accumulator which is improved regarding efficiency and which at the same time is suitable to be integrated in a hearing instrument. Further, there may be a need for an apparatus for transferring energy to an accumulator which can easily be handled even by elderly persons.

According to embodiments Magnetic Induction (MI) technology is utilized. MI is known to be a low-power communications solution for RFID, Near Field Communications (NFC), Wireless Body Area Networks (WBAN), and has been applied in wireless headsets (AuraComm LibertyLink, FreeLinc) and hearing aids (Phonak, using NXP's MI Radio technology). According to embodiments Magnetic Induction (MI) technology is utilized for inductive charging of an accumulator comprised in hearing aid.

OBJECT AND SUMMARY OF THE INVENTION

According to an embodiment an apparatus for transferring energy to an accumulator is provided, wherein the apparatus comprises a core (also referred to as secondary core); and a wire (also referred to as secondary wire) wound around the core thereby forming a coil (also referred to as secondary coil), wherein the coil is adapted to receive energy from a magnetic field, wherein the wire is connectable to the accumulator to transfer the received energy to the accumulator.

The apparatus may be any apparatus requiring electric energy stored in the accumulator. In particular, the apparatus may comprise or be a hearing instrument or a hearing aid for amplifying an acoustic signal, an audio signal, or sound. Thus, the apparatus may be a device which may be worn by a person close to the ear of the person. In particular the hearing instrument may comprise a housing or a casing which harbours the accumulator and in particular other circuitry, such as an amplifier, and also a microphone and/or a loud speaker.

For amplification of the acoustic signal the apparatus, in particular the hearing instrument, may require electric energy. The electric energy may be taken from the accumulator to electronically amplify an electric signal representing an acoustic signal (generated for example by a microphone) and to convert the amplified signal back into an acoustic signal or sound (for example by a loudspeaker). According to an embodiment the hearing instrument may comprise a digital wireless hearing instrument which may have Digital Signal Processing means, non-volatile memory, microprocessor, wireless communication means, and further components, all requiring energy from the accumulator.

The core of the coil may comprise solid material, in particular a metal, such as iron, in particular ferrite ($\alpha$-Fe). Further in particular, the core may comprise any other material having a high magnetic permeability, in particular having a permeability larger than that of air, in particular having a relative permeability larger than 1.

The wire wound around the core may comprise a conductor (for example a metal such as copper) and an insulating layer around the conductor for isolating adjacent conductor portions from each other. The wire may be wound around the core one or more times, such as between one and 30 times. The coil formed by the core and the wire wound around the core may have a self inductance between 0 and 10 micro Henry ($\mu H$), in particular between 1 and 5 $\mu H$. The coil is adapted to receive an amount of energy large enough to charge an accumulator, in particular an accumulator used in a hearing instrument. In particular, the energy received by the coil may be considerably larger than energy received from a communication signal.

The coil may be adapted to receive energy from a magnetic field by electromagnetic induction. Magnetic induction (MI) technology may also be used for a low power communication solution, but this communication requires less energy than required for charging an accumulator.

The wire may be electrically connectable (or electrically connected) to the accumulator via a lead. In particular, the wire may be connected to the accumulator via a circuitry. The circuitry may transform a signal representing the energy received from the magnetic field to provide an appropriate charging signal (or current) to the accumulator. The transforming the electric signal carrying the received energy may in particular comprise rectifying the electric signal and/or transforming a voltage/current level of the electric signal.

According to an embodiment the core comprises a material having a relative magnetic permeability greater than 30, in particular greater than 40. The permeability is a measure of the ability of a material to confine the formation of a magnetic field within itself. In other words, it is the degree of magnetization that a material obtains in response to an applied magnetic field. Permeability is the inductance per unit length and may be measured in Henry per meter (H/m). The relative permeability of a material is the ratio of the permeability of the material to the permeability of free space which is given by the magnetic constant $\mu_0$. Thus, the permeability of the material comprised in the core is 30 times, in particular 40 times, greater than the permeability of free space. Thereby, the magnetization of the core in response to an applied magnetic field is 30 times, in particular 40 times, greater than the magnetization that the free space obtains in response to the applied magnetic field. Thereby, the magnetic field may be enhanced within the core according to an embodiment compared to a core having a smaller relative magnetic permeability. The magnetic field may have a greater magnitude within the core compared to a coil having a "core" not comprising a solid material, in particular comprising only air. Thereby, the efficiency of transfer of the received energy may be improved.

According to an embodiment the core has a rod shape. In particular, the core may be elongated in a longitudinal direction having a first extent in the longitudinal direction and may have a smaller extent in a direction perpendicular to the longitudinal direction. In particular, an extent in the longitudinal direction (direction of elongation) may be two times to five times greater than the extent in the direction perpendicular to the longitudinal direction. In particular, the core may have a rod shape, wherein a cross-sectional shape may be circular, rectangular, or quadratic. In particular, the core may have at least approximately a cylinder shape.

In particular, the wire may be wound around the core having one or more windings being spaced apart in the longitudinal direction. In particular, when the core has a rod shape, in particular a cylinder shape, the rod may have at least approximately rotational symmetry, wherein the longitudinal direction may be along a symmetry axis (such as rotational symmetry axis), wherein the shape of the core may define a circumferential direction perpendicular to the longitudinal direction. In particular, the one or more windings of the wire may extend along the circumferential direction or extend at least approximately along the circumferential direction, or may extend along a direction having one component in the circumferential direction and one component in the longitudinal direction (symmetry axis direction), thereby forming a spiral wire arrangement. Thus, the shape of the core may define a shape of the wire wound around the core. By the rod shape a more effective guiding of the magnetic field by the core may be achieved, thereby improving the efficiency of the energy transfer.

According to an embodiment the core has an extent between 1 mm and 15 mm, in particular between 2 mm and 10 mm. Thereby, the extent may represent a size (unit meter) of the core in an arbitrary direction. In particular, there may be no direction along which the core has a size smaller than 1 mm, in particular smaller than 2 mm, and there may be no direction along which the core has a size greater than 15 mm, in particular greater than 10 mm. In particular, when the core has a rod shape the longitudinal direction (the direction of maximal extent of the rod, in particular along a symmetry axis of the rod) may be greater (be a factor between 1.5 and 5) than an extent perpendicular to the longitudinal direction. Thereby, the core and in particular also the coil formed by the wire wound around the core may fit into a pretty tiny device, such as in particular into a hearing device. In spite of the small size the efficiency of transferring the energy received from the magnetic field may still be maintained, in particular requiring less charging time than in prior art apparatuses.

According to an embodiment the apparatus further comprises a tuning controller electrically connected (or electrically connectable) to the wire for tuning a frequency of the received magnetic field. In particular the magnetic field may have a frequency in a range between 5 MHz and 20 MHz, in particular between 7.5 MHz and 15 MHz. In particular, the tuning controller may be adapted to tune a frequency of a resonant circuit comprising the coil such that the coil has an improved efficiency of receiving the energy of the magnetic field having the tuned frequency. A resonant circuit may be formed by connecting at least a (in particular variable) capacitor and an optional resistor, in parallel or in series with the coil (inductor). The resonant circuit may be characterized by a resonant frequency. This resonant frequency may preferably be aligned to the frequency of the magnetic field. This may be achieved: (i) by a tuning controller adjusting the capacitance of the (variable) capacitor such that the resonant frequency of the circuit matches the magnetic field frequency; (ii) by adjusting the primary signal frequency such that it aligns with the resonant frequency of the circuit.

Thereby, the efficiency of the apparatus for transferring energy to an accumulator may be improved.

According to an embodiment the apparatus further comprises a charging controller including a rectifier, wherein the wire is electrically connectable (or electrically connected) to the accumulator at least via the charging controller. The charging controller may be adapted to transform the electric signal supplied from the coil (generated by induction by the magnetic field) to generate a charging current refined with respect to charging the accumulator. In particular, the alternating signal may be rectified (converted to direct current) by the rectifier before supplying the rectified signal to the accumulator. Further electronic or electric components may be connected within the path of the electric signal towards the accumulator to allow refining the charging current provided to the accumulator. Thereby, the charging process of the accumulator may even further be refined, in particular regarding reduction of charging time.

Further, the charging controller may limit (reduce) the amount of energy delivered to the battery or accumulator, as to protect the battery from overcharging, overheating, as to preserve battery capacity over its lifetime and safeguard against damage, leakage, and/or explosion.

According to an embodiment the apparatus further comprises a near-field communication system connectable to the wire. The near-field communication system (or short range communication system) may be adapted to generate a communication signal to be transmitted via the coil and/or to receive a communication signal received via the coil. The coil may act as a transmitter coil for the near-field communication system and further, the coil may also act as a receiver coil for the near-field communication system. The near-field communication system may in particular be a near-field magnetic induction communication system adapted for short-range wireless communication by coupling a low-power non-propagating magnetic field between devices. The near-field communication system may comprise circuitry to generate a communication signal to be transmitted via the coil. Further, the near-field communication system may comprise circuitry to process a communication signal received via the coil.

The communication signal transmitted via the coil may not radiate into free space but may transmit the communication signal in the "near-field" range, wherein the strength of the magnetic field may be inversely proportional to the sixth power of the distance from the coil. Given a frequency of the magnetic field a crossover point between near-field and far-field may be defined. In contrast to the near-field region of the communication the strength of the magnetic field varies within the "far-field" region inversely proportional to the second power of the distance to the coil. Thus, the attenuation of the magnetic field within the near-field is much stronger than in the far-field region.

Thereby, the coil may be used as a transmitter/receiver coil in the near-field communication system as well as for a coil for receiving energy of a magnetic field for charging the accumulator. Thereby, two functions may be performed by the coil thus simplifying the construction of the apparatus and reducing the costs of the apparatus.

The proposed solution may require no additional discrete components at the hearing instrument side; since it has been demonstrated that the same (antenna) coil which is used for digital short-range communications, can also be used for inductive charging. In particular, the required additional functionality (rectifier and charge control) may be integrated as a feature extension in the 2nd generation of the MI Radio solution at the cost of a few mm2 silicon area. First generation of the MI Radio solution may already be deployed in hearing instruments for short range communications.

Furthermore, since inductive charging may occur at a similar or at the at least approximately same frequency and bandwidth as the short-range communications link (in fact, charging may be simply transmission at an increased power level), a smart charger may also utilize this link as a communication channel to optimize the charging procedure. The use of this same channel also reduces efforts for approbation.

According to an embodiment the apparatus is configured to selectively connect the accumulator or the near-field communication system to the wire. Thereby, at certain periods in time the coil may be used for receiving energy from a magnetic field for charging the accumulator and at other periods in time the coil may be used for transmitting/receiving a communication signal. Thereby, switching the connection of the wire to the accumulator or the near-field communication system may be performed manually or may be alternatively be performed by a controller which controls connection of the wire to the accumulator or the near-field communication system based on an external command (possibly obtained by wireless communication in particular using the communication system) or based on an internal state of the apparatus (in particular of the accumulator), such as an energy capacity or charge state. Thereby, only one coil needs to be provided for performing two functions, receiving energy for charging the accumulator and performing near-field communications.

According to an embodiment the functions charging and communication may not necessarily be performed intermittently. Thus, simultaneous charging and communication (transmission and/or reception) may also be viable. In this case the charge signal may be a modulated wave carrying information.

According to an embodiment the near-field communication system is adapted to generate a signal indicative of an energy demand, the signal being transmittable via the coil. In particular, the signal may be indicative of an energy demand of the accumulator connectable to the wire. In particular, the near-field communication system may generate the signal indicative of the energy demand, when the accumulator is charged to a capacity less than 10%, in particular less than 50%, further in particular less than 75%, of its maximal capacity. The generated signal may be receivable by a charging station according to an embodiment and may cause the charging station to supply a magnetic field which may in turn be received by the coil and (since the connection may have been switched such that the accumulator may be connected to the wire) supplied to the accumulator to charge the accumulator. Thereby, the apparatus may indicate to the external charging station that it requires energy for proper function. Thereby, failure of the apparatus due to a lack of energy may be avoided. In case the battery is completely depleted, the device may have no energy for transmission. Hence an initiation by the charger as described below in further detail may be performed involving a charge cycle.

According to an embodiment an energy demand request may be comprise information representing a power level and/or a charging time.

Further, the near-field communication system may be adapted to generate a signal indicative of a sufficient charge state of the accumulator, the signal being transmittable via the coil. Thereby, the near-field communication system may generate the signal indicative of a sufficient charge state of the accumulator, when the accumulator is charged to a degree of more than 50%, in particular 75%, in particular 90%, of its maximum charging capacity. Thereby, the signal may be transmittable to a charging station to indicate that charging of the accumulator may be terminated or may be not required. Thereby, overcharging of the accumulator may be avoided thus prohibiting a damage of the accumulator.

According to an embodiment the apparatus further comprises an audio amplification system for amplifying an audio signal using energy stored in the accumulator. Thus, the amplification system may be connectable to the accumulator. Thereby, the apparatus may function as a hearing aid or a hearing instrument which may be carried (at the ear) by a person having reduced hearing capability.

Thus, the apparatus may essentially be a hearing apparatus. The hearing apparatus may comprise a microphone for converting an acoustic signal (audio signal or sound) to an electric signal; an amplifier for amplifying the electric signal to an amplified electric signal; and a loudspeaker for converting the amplified signal to an acoustic signal (audio signal or sound) to be supplied to the ear of the person carrying the hearing instrument. The hearing apparatus may include a A/D converter, digital signal processing, D/A converter, where digital signal processing may be specifically adjustable to the hearing impairment, according to parameters stored in non-volatile memory, which may be programmed using a wired connection or the short-range wireless communication link.

Due to the enhanced charging functionality of the apparatus compared to the prior art the hearing instrument may be operated more easily and reliably. In particular, recharging the accumulator within the hearing instrument may be easier and may faster be performed compared to a conventional hearing instrument.

According to an embodiment any embodiment of the apparatus for transferring energy to an accumulator explained and described above may comprise an accumulator which is electrically connectable (or electrically connected) to the wire to transfer the received energy to the accumulator. Thereby, the apparatus comprises an electrical storage for storing electrical energy for performing the functions of the apparatus.

According to an embodiment the apparatus for transferring energy comprises an accumulator electrically connectable (or electrically connected) to the wire to transfer the received energy to the accumulator. The accumulator may be charged by a signal supplied from the wire representing a signal generated by the coil upon induction of a current caused by an external magnetic field.

According to an embodiment a charging station for generating a magnetic field for transferring energy to an accumulator is provided, wherein the charging station comprises a further wire wound such as to form a first further coil and a second further coil spaced apart from the first further coil and being arranged parallel to the first further coil, wherein the further wire is connectable to an electric energy source for generating the magnetic field.

The first further coil and the second further coil may together form a so called Helmholtz coil, the first further coil and the second further coil being connected in series, being parallel to each other (a first plane, such as a plane perpendicular to a winding axis of the wire of the first further coil, of a maximal extent of the first further coil may in particular be at least approximately parallel to a second plane, such as a plane perpendicular to a winding axis of the further wire of the second further coil). The distance between the first further coil and a second further coil (in a direction perpendicular to the first plane and the second plane, i.e. along the winding axis of the further wire) and also diameters of the first further coil and a second further coil may be adapted in order to obtain a uniform magnetic field in a space between the first further coil and a second further coil.

Using the charging station an inductive coupling system for wireless (contactless) charging of e.g. a rechargeable hearing instrument is provided, comprising a charger having a primary coil characterized by a Helmholtz coil construction (with or without an accompanying ferrite rod), and e.g. a hearing instrument device having a secondary coil with a ferrite rod core. Said secondary coil may be connected to a battery charging subsystem as well as to a short-range communications subsystem.

Thereby, the charging system does not need to use or comprise a U-shaped ferrite rod, since the Helmholtz coil used as the primary coil is very effective. This has as main advantages that no ferrite rod is needed which substantially reduces weight and cost and that strong coupling between primary and secondary coil can be achieved leading to high charging efficiency. Additionally, since a Helmholtz coil provides an approximately uniform magnetic field between both halves of the coil, the coupling factor between primary and secondary coil may not be very dependent on the exact positioning of the primary coil. This may ease the mechanical design of the charger module.

According to an embodiment a system for charging an electric accumulator is provided, wherein the system comprises an embodiment of an apparatus for transferring energy to an accumulator as described above; and a charging station comprising a further wire (also referred to as primary wire) wound such as to form a further coil (also referred to as primary coil), the further wire being connectable to an electric energy source for generating a magnetic field, wherein the apparatus and the charging station are configured and arrangeable relative to each other such that the magnetic field generated by the further coil induces a current in the wire thereby transferring energy from the charging station to the apparatus for transferring energy.

In particular, the further wire may be wound around a further (high magnetic permeability) core (also referred to as primary core) to enhance the magnetic field and the magnetic flux.

In particular, the charging station may be configured to generate an oscillating magnetic field having a frequency between 5 MHz and 20 MHz, in particular between 7 MHz and 15 MHz. Further, the charging station may comprise a tuning circuit for tuning a frequency of a resonant circuit comprising the primary coil so that it aligns with the operating (oscillator) frequency of the magnetic field which is transmitted by the further coil. In particular, the further wire may be connectable to a circuitry adapted to generate the oscillating signal, wherein the energy for generating the electric signal may be taken from the electric energy source.

The further core may comprise a solid material, such as a metal which in particular has a greater magnetic permeability than free space. In particular, the further core may comprise a material having a relative magnetic permeability greater than 30, in particular greater than 40. In particular, the further core may comprise ferrite. Thereby, an efficiency of generating the magnetic field may be improved. Further, the magnetic field may be localized to a smaller region compared to a region when no further core is present within the further coil. Thereby, transmission of electric energy by induction may be more accurately directed to a device or apparatus for transferring the energy to an accumulator. Thereby, loss of energy may be reduced. In particular, the apparatus for transferring energy to an accumulator may be arranged (or arrangeable) relative to the charging station such that the magnetic field generated by the charging station using the further coil is coupled to the coil of the apparatus for transferring energy to the accumulator having a coupling coefficient (ratio of magnetic flux) being greater than 0.05, in particular greater than 0.1, further in particular greater than 0.15. In order to achieve such a high coupling coefficient it may be required to appropriately design and select the material of the core, the material of the further core, the shape of the core, the shape of the further core and/or relative orientation of the core and the further core and/or distance(s) between surfaces of the further core and surfaces of the core.

According to an embodiment the charging station for generating a magnetic field for transferring energy to an accumulator or the system for charging an electric accumulator, further comprises a further core around which the further wire is wound, wherein the further core in particular has a U-shape, a horse-shoe shape or a toroid shape. In particular, the further core may at least approximately have a U-shape comprising two at least approximately parallel portions and one portion connecting the two parallel portions, in particular at ends thereof. In particular, the further core may comprise a horizontal section and two (parallel) vertical sections connected to the horizontal section and extending at least approximately perpendicular to the horizontal section. In particular, the two vertical sections may be at least approximately parallel to each other and may oppose each other. Each section, the horizontal section and the two vertical sections may be of a rod shape. A cross-sectional shape of the horizontal section and the two vertical sections may be rectangular, quadratic or circular.

According to an embodiment the further core of either the charging station for generating a magnetic field for transferring energy to an accumulator or the system for charging an electric accumulator comprises a material having a relative magnetic permeability greater than 30, in particular greater than 40, in particular for enhancing the magnetic field and/or an efficiency of energy transfer.

The further wire may be wound around the core such that the further wire is wound only around the horizontal section according to an embodiment. According to a further embodiment the wire is wound only around one or more of the two vertical sections of the further core but not around the horizontal section of the further core. According to another embodiment the further wire is wound around the vertical section(s) as well as around the horizontal section. According to a still further embodiment the further coil comprises one or more further wires wound around the vertical section(s), and/or the horizontal section. By providing the further core with a U-shape guiding the magnetic field may be such that the density of the magnetic field (density of magnetic field lines) may be enhanced, in particular in spatial regions between the two vertical sections of the further core compared to other regions around the further core. Thereby, the magnetic field may be localized efficiently to a predetermined region around the further coil, in particular between the two vertical sections of the further coil. Thereby, an efficiency of transfer of energy from the magnetic field generated by the charging station to the apparatus for transferring energy to an accumulator may be improved. According to another embodiment the further core has at least approximately a horseshoe shape, thereby providing an advantageous localization of the magnetic field in a region between opposing end surfaces of the horseshoe shaped further core.

According to an embodiment the further core comprises a first surface region and a second surface region opposite to the first surface region, the first surface region and the second surface regions being configured to form regions of enhanced density of magnetic flux compared to other surface regions of the further core, wherein the charging station and the apparatus are arrangeable such that the core is arranged between the first surface region of the further core and the second surface region of the further core. The region of enhanced density of magnetic flux may represent a region of enhanced density of magnetic field lines, in particular parallel to normals of the first and second surface regions. In particular, this region may represent a region of enhanced magnitude of the magnetic field compared to other regions of the surface of the further core. In particular, the first surface region and the second surface region may represent regions, wherein the magnetic field lines have a direction being at least approximately parallel to a surface normal of the first surface region and a surface normal of the second surface region. Thus, a flux of the magnetic field through the first surface region and the second surface region may be larger than a flux of the magnetic field through any other surface region of the further core having the same size as the first surface region and the second surface region. Thus, the apparatus for transferring energy to an accumulator, in particular a hearing instrument comprising a casing harbouring the secondary coil and an accumulator, may be arrangeable in particular within the region between the first surface region and the second surface region having an enhanced magnitude of the magnetic field (density of magnetic field lines) compared to other regions around the further coil. Thereby, an efficiency of transfer of energy from the charging station to the apparatus for transferring energy to an accumulator may be improved.

According to an embodiment a distance between a first end of the core and the first surface region of the further core is between 0 mm and 20 mm, in particular between 0 mm and 5 mm, in particular between 1 mm and 3 mm, wherein in particular a distance between a second end of the core, the second end of the core being opposite to the first end of the core, and the second surface region of the further core is between 0 mm and 20 mm, in particular between 0 mm and 5 mm, in particular between 1 mm and 3 mm. Since the stray field, i.e. the non-contributing fraction of the primary magnetic field, increases significantly as the air gap becomes larger, it may be advantageous to place the coil very close to the further coil, in particular very close to the first surface region and the second surface region of the further coil. Thereby, a coupling between the further coil and the coil may be improved to improve the efficiency of energy transfer from the charging station to the apparatus, in particular to the hearing instrument comprising the accumulator.

According to an embodiment a method for transferring energy to an accumulator is provided, wherein the method comprises receiving energy from a magnetic field via a coil, the coil being formed by a core and a wire wound around the core; and connecting the wire to the accumulator to transfer the received energy to the accumulator. By providing the core within the coil the efficiency of transfer of energy may be improved.

According to an embodiment the charging station comprises an oscillator for generating an electric signal having a frequency between 4 MHz and 20 MHz, in particular between 8 MHz and 16 MHz, the electric signal being deliverable to the further wire. Thereby, the charging station may generate an alternating or oscillating magnetic field having a predetermined frequency. In particular, the tuning controller of the apparatus for transferring energy to the accumulator may tune its resonance frequency to essentially match the frequency of the electric signal generated by the oscillator of the charging station to thereby improve the efficiency of transfer of energy from the charging station to the apparatus for transferring energy to the accumulator, in particular to the hearing instrument comprising the accumulator.

Although the above embodiments have been described in the context of an apparatus for transferring energy to an accumulator, the features (individual or in combination) of the described embodiments also apply to a system for charging an electric accumulator and to a method for transferring energy to an accumulator.

It has to be noted that embodiments of the invention have been described with reference to different subject matters. In particular, some embodiments have been described with reference to method type claims, whereas other embodiments have been described with reference to apparatus type claims. However, a person skilled in the art will gather from the above and the following description that, unless otherwise notified, in addition to any combination of features belonging to one type of subject matter also any combination between features relating to different subject matters, in particular between features of the method type claims, and features of the apparatus type claims, is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment, but to which the invention is not limited.

BRIEF DESCRIPTION OF THE FIGURES

FIGS. 1A and 1B schematically illustrate a further coil (primary coil) of a charging station and a hearing instrument comprising a coil (secondary coil) forming a system for charging an electric accumulator according to an embodiment;

FIGS. 2A-2I schematically illustrate further embodiments of a system for charging an electric accumulator according to embodiments;

FIGS. 8A-8G schematically illustrate further embodiments of a system for charging an electric accumulator according to embodiments.

DESCRIPTION OF EMBODIMENTS

Figure 3:
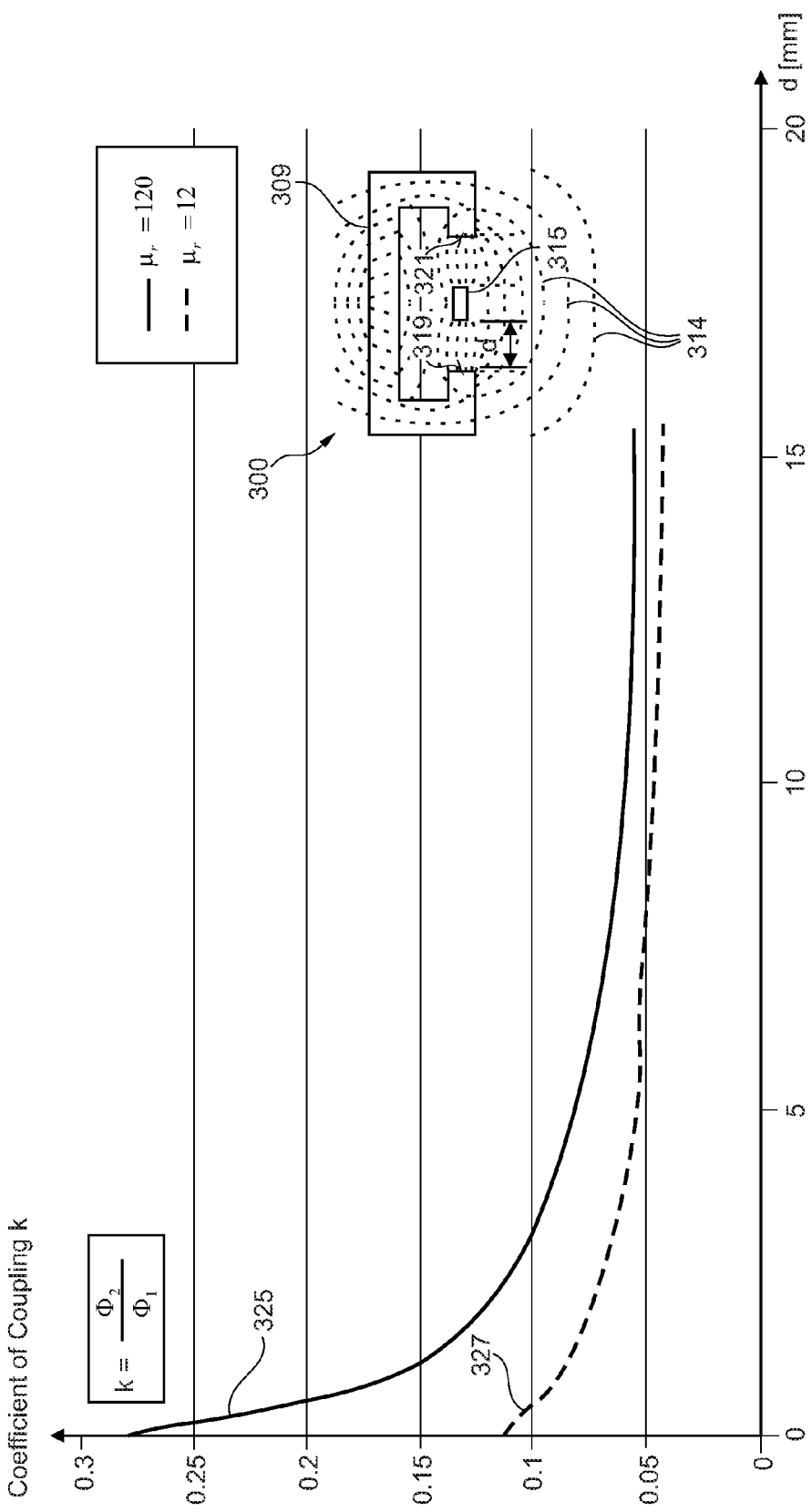
FIG. 3 illustrates a graph showing a coupling property of a system for charging an electric accumulator according to an embodiment.

FIG. 1 schematically shows a system 100 for charging an electric accumulator according to an embodiment. The system 100 comprises a further coil 103 (primary coil) of a charging station and a hearing instrument 105 having an accumulator 107 to be charged (between the coil 113 and the accumulator 107 at least one not illustrated rectifier is connected).

The hearing instrument further comprises a casing harbouring the accumulator 107 and a microphone for converting an acoustic signal into an electric signal, an amplifier for amplifying the electric signal and a loudspeaker for generating an acoustic signal from the amplified electric signal, wherein the acoustic signal represents an amplified acoustic signal to be supplied to an ear of a person having reduced hearing capabilities. The further coil 103 comprises a further core 109 which has a U-shape. In particular, the further core 109 comprises a horizontal section having a length of 22 mm and two vertical sections 108 having a length of 18 mm, as indicated in FIG. 1A. In cross-section the further core 109 is square-shaped having an extent of 6 mm×6 mm.

Wound around the horizontal section of the further core 109 it is a further wire 111 which is connected to an oscillator and a control circuit to supply an oscillating current through the further wire 111 such that a magnetic field is generated within the further core 109 and surrounding space. Between the two vertical sections 108 of the further core 109 the hearing instrument 105 is arranged such that a coil 113, core 115 and a wire 117 is arranged between opposing surfaces 119 and 121 of the vertical sections 108 of the further core 109. At the surface regions 119 and 121 magnetic flux of the magnetic field generated within the further core 109 is enhanced relative to other surface regions of the further core 109. The magnetic field generated by the further coil 103 penetrates through the core 115 of the hearing instrument 105 and induces a current in the wire 117 to provide a charging current for the accumulator 107.

As is illustrated in FIG. 1B the core 115 is rod-shaped having a circular shape in cross-section, wherein the rod is 6 mm in length and wherein the circle of the cross-section has a diameter of 2 mm.

The "magnetic subsystem" may deviate from prior art in that it utilizes the ferrite rod coil 113 (optimized for short-range communications) as secondary coil at the hearing device side, and proposes a primary coil 103 adapted thereto, with a U-shaped core.

In generalized form, the magnetic subsystem may comprise one or more primary and one or more secondary coils, each composed of a high-permeability core material around which a conductor is wound, where the shape of the primary coil 103 (core) may be characterized by one cavity (e.g. U-shape) or more cavities (e.g. E-shape), in which cavities the secondary coil(s) 113 can be positioned with a minimal "air" gap (as dictated by enclosures of the devices).

Further on the mechanical design of the charging cradle, considering the variety of hearing instruments including behind the ear (BTE) instruments, in the ear (ITE) and in the canal (ITC) instruments, according to an embodiment it may be desirable to have a common charger design, but specific plastic inserts/cups to hold each hearing instrument type or model, as to ensure proper hook up of the device and alignment of the magnetic subsystem.

Depicted in FIG. 1 is a detailed drawing of the magnetic subsystem, and a summary of its specifications. The device coil 113 may be the same as used for short range communications in hearing instruments: the ferrite rod core 115 with diameter of 2 mm and length of 6 mm may be made of a high permeability soft ferrite (FerroxCube material designated 4C65), may carry 22 shielded conductor windings, providing an inductance of +/−3.6 micro Henry and Q of +/−50, as required for communication at 10.6 MHz with a communication bandwidth of 300 kHz. The charger coil 103 may be realized using the same core material, may have a square section of 6 mm*6 mm and 22 mm*18 mm outer dimensions, leaving 12 mm deep and 10 mm wide cavity, i.e. 2 mm space at each side for plastics of the hearing instrument and cup insert. The core 109 may carry 9 shielded conductor windings to obtain a same coil inductance of approximately 3.6 micro Henry.

With this magnetic subsystem, a coupling factor k of 0.11 was obtained (simulated and measured), which with the given coil quality factor Q=50 and under ideal resonant and matched load conditions may yield an energy transfer efficiency up to 65% (inductive link only, assuming an ideal power source). An exemplary specification is given in table 1 below.

TABLE 1

Summary of specifications

| Description | Value | Comments |
|---|---|---|
| Device coil | | |
| Core dimensions | 6 mm × Ø2 mm | |
| Coil windings | 22 | |
| Self inductance | +/−3.6 pH | |
| Charging coil | | |
| Core section | Square, 6 mm × 6 mm | |
| Core size | U-shape, 22 mm × 18 mm | |
| Coil windings | t.b.d. | |
| Self inductance | +/−3.6 pH | |
| Operating frequency | 8-16 MHz | |
| Material permeability $\mu_r$ | >40 | |
| $B_{SAT}$ | >200 mT | |

FIGS. 2A-2I illustrate further embodiments of a system for charging an electric accumulator for charging on or more accumulator (of a hearing instrument). FIG. 2A thereby corresponds to the embodiment illustrated in FIG. 1A.

In FIG. 2B a variant of the U-shaped core 109 is provided, wherein the core 209 has a horseshoe shape. Simulations indicate that a slight improvement of the coupling performance with optimal positioning of the coil 213 can be obtained, although higher sensitivity to positioning is observed (thus more significant degradation with sub-optimal positioning). Compared to the embodiments shown in FIG. 2A the horseshoe shaped further core 209 has additional horizontal end pieces connected to the two vertical core sections 208 such that the magnetic field exiting the further core 209 at the opposite surface regions 219 and 221 may more accurately be directed through (or into) the core 215 of the hearing instrument 205.

In a slight variation of the horseshoe shaped further core 209 the further core 209 illustrated in FIG. 2C has a curved shape essentially be formed by a ring having a recess for providing the surface regions 219 and 221 in between of which the hearing instrument 205 is placed.

FIGS. 2D-2I illustrate variants of dual charger systems according to embodiments for charging two accumulators. In FIG. 2D essentially two systems as illustrated in FIG. 2A are arranged side by side, thereby doubling the charging capabilities. FIG. 2E illustrates a further core 209 of a charging station, wherein the further core 209 has a shape of two Us arranged side by side thereby forming an E-shape. In particular, the further core comprises three vertical sections 208 and one horizontal section to which all three vertical sections 208 are connected. The vertical sections 208 of the further core 209 are arranged parallel to each other, wherein a first hearing instrument 205a is placed between one outer vertical section of the further core and the inner vertical section of the further core 209, while the other hearing instrument 205b is placed between the inner vertical section of the further core 209 and the other outer vertical section of the further core 209. The further wires 211a, 211b and 211c may be wound around the horizontal section of the further core 209 at different positions and/or around the central vertical section of the further core. Thereby, the further core 209 essentially assumes an E-shape.

FIG. 2F illustrates an embodiment of a system for charging an electric accumulator, wherein the further core 209 has a U-shape, wherein the two vertical sections 208 of the further core have a distance such that two hearing instruments 205a and 205b may be arranged between the two vertical sections 208 of the further core 209.

FIG. 2G schematically shows a variant, wherein the further core comprises a first further core 209a having a U-shape and a second further core 209b being placed between the two vertical sections of the first further core 209a such that a first hearing instrument 205a may be placed between a vertical section of the first further core 209a and the second further core 209b and a second hearing instrument 205b may be placed between the second further core 209b and the other vertical section of the first further core 209a. Further, the further wire 211a and 211b may be wound around the first further core and/or the second further core 209b.

FIG. 2H illustrates another embodiment of a system for charging an electric accumulator, wherein the further core 209 has a U-shape, but wherein the vertical sections 208 are longer than the vertical sections of the embodiments illustrated in FIGS. 2A-2G. Thereby, two hearing instruments 205a and 205b may be placed in parallel between the two vertical sections 208 of the further core 209.

FIG. 2I schematically shows a top view of another embodiment of a system for charging an electric accumulator, wherein the further core 209 has a U-shape but having a greater depth than afore-described embodiments. Thereby, two hearing instruments 205a and 205b may be placed behind each other between two vertical sections 208 of the further core 209.

For the embodiment illustrated in FIG. 2B simulations of the magnetic field distributions were performed. FIG. 3 illustrates a graph showing on its abscissa the distance d between the surface region 219 of the further core 209 and the end surface of the core 215 and on its ordinate the coupling coefficient k calculated as a flux ratio of a flux of the magnetic field through the surface region 219 and a flux of the magnetic field through the end surface of the core 215. The solid line 325 indicates the coupling coefficient k for the case, where the relative magnetic permeability of the materials of the core 215, 315 and the further core 209, 309 is 120, while the curve 327 indicates the coupling coefficient k for the case, where the relative magnetic permeabilities of the core 215, 315 and the further core 209, 309 are 12. As can be observed the coupling coefficient increases for both cases of relative magnetic permeabilities when the distance d between the surface region 219 and the end surface of the core 215 decreases. It can further be observed that the coupling coefficient increases when the relative magnetic permeability of the core 215 and the further core 209 increases. In particular good coupling is achieved, if the relative permeability is larger or equal than 40 and if the distance d is smaller than 3 mm in particular about 2 mm.

Figure 4:
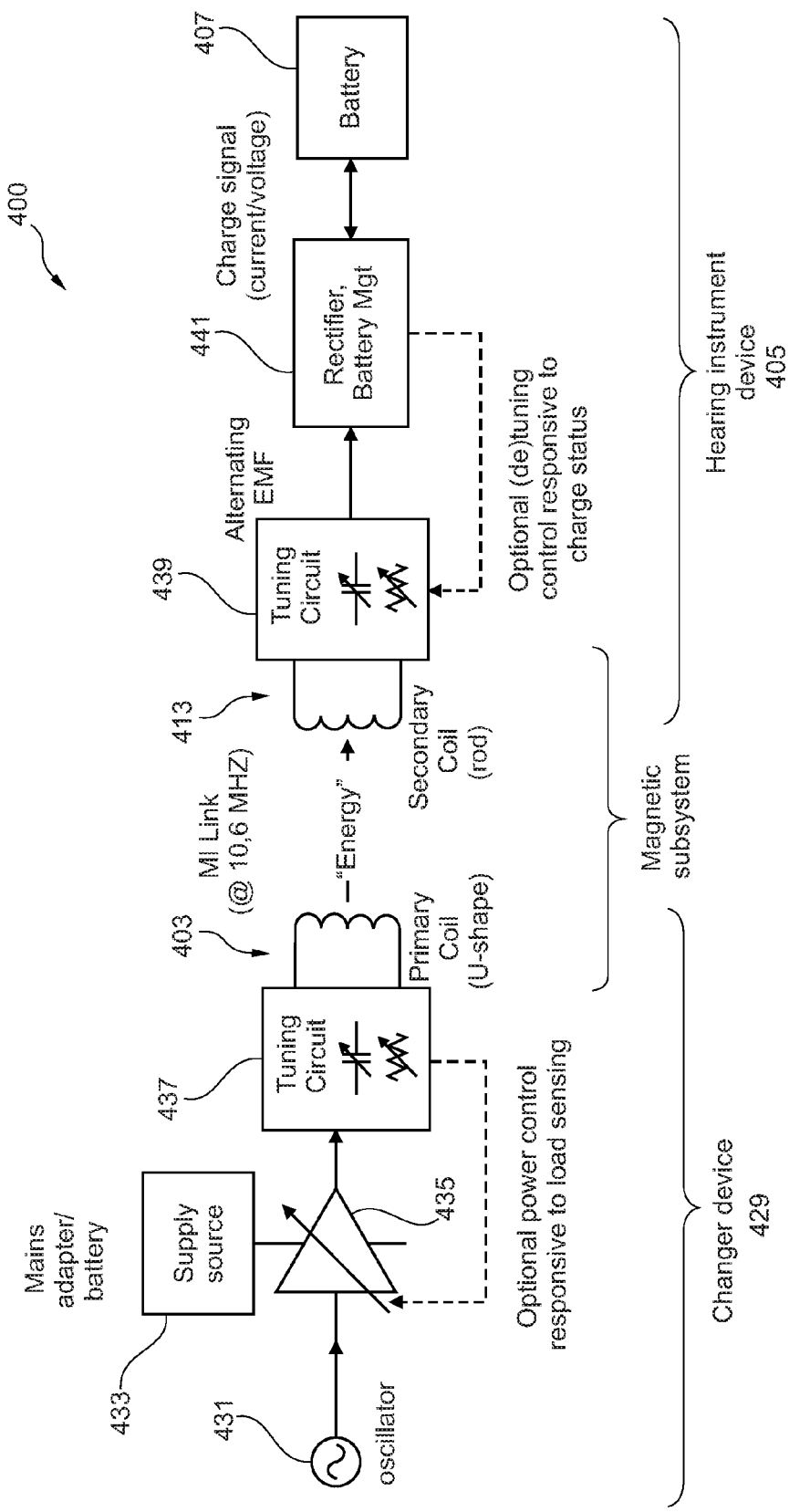
FIG. 4 schematically illustrates a further embodiment of a system for charging an electric accumulator.

A system 400 for charging an electric accumulator according to an embodiment is schematically illustrated in FIG. 4. The system comprises a charger device 429 (also referred to as charging station) and a hearing instrument device 405. The charger device comprises an oscillator 431 for generating an oscillating electric signal which is supplied to a circuitry 435. The charger device 429 further comprises a supply source 433 for supplying electric energy to the circuitry 435. From the oscillating signal and the supplied energy the circuitry 435 generates an electric energy signal and supplies it to a tuning circuit 437 comprising a tunable capacitor and a tunable resistor, respectively for aligning the resonance frequency and bandwidth of the tuned circuit with said electric energy signal supplied to the further coil 403 (also referred to as primary coil), in particular having a U-shaped further core. At a frequency of 10.6 MHz a magnetic inductor (MI) link is established to transfer energy from the further coil 403 to the coil 413 (also referred to as secondary coil), in particular having a rod-shaped core. The magnetic field generated by the further coil 403 penetrates the coil 413 and thereby induces a current in the coil 413, in particular when the coil 413 is tuned to the frequency of the magnetic field using the tuning circuit 439. The electric energy signal is further transmitted to a rectifier and battery management system 441 which generates from the oscillating energy signal a rectified electric energy signal which is then supplied to the accumulator 407. Optionally the rectifier and battery management system 441 may send a signal to the tuning circuit in response to a charge status of the accumulator 407. Further, also optionally the tuning circuit 437 of the charger device 429 may control the power provided by the circuitry 435 based on sensing a load.

FIG. 4 may be considered as a basic charging subsystem. The charger 429 may typically be a mains powered stationary device for daily overnight recharge, but may as well be a portable battery-powered (quick-) charger, or a combination of both; it may comprise an oscillator 431 and (variable gain) amplifier to drive the coil 403, and preferably a (fixed or adjustable) tuning circuit 437 for resonant operation The hearing instrument 405, next to its conventional components (microphone, receiver=speaker, signal processor), may have a rechargeable (NiMH, LiIon) battery, connected to a battery charging controller 441, connected to a rectifier, connected to the coil 413 with an optional tuning circuit 439. The battery charging controller may include any of DC/DC converters, voltage/current stabilizers, timing circuits, temperature & voltage monitoring, coulomb counting, and hard-wired or soft control procedures as know in conventional battery charging circuits.

In its simplest form, the charger may be "always on", unaware of the presence of a device or its charge status. In such case, if the battery is fully charged, the charge current is disabled, such that secondary load (current) drops, which may result in very high voltages at the resonant circuit, and overvoltage at terminals of the integrated circuit. This may be prevented by deliberate detuning, dummy loading, or overvoltage protection diodes, or a combination of these provisions.

One may consider to control the primary power by load sensing, however with the given coupling factor, a reliable method for sensing presence or amount of secondary load from the primary is not obvious. Therefore it is preferred to use a reliable communication channel.

Figure 5:
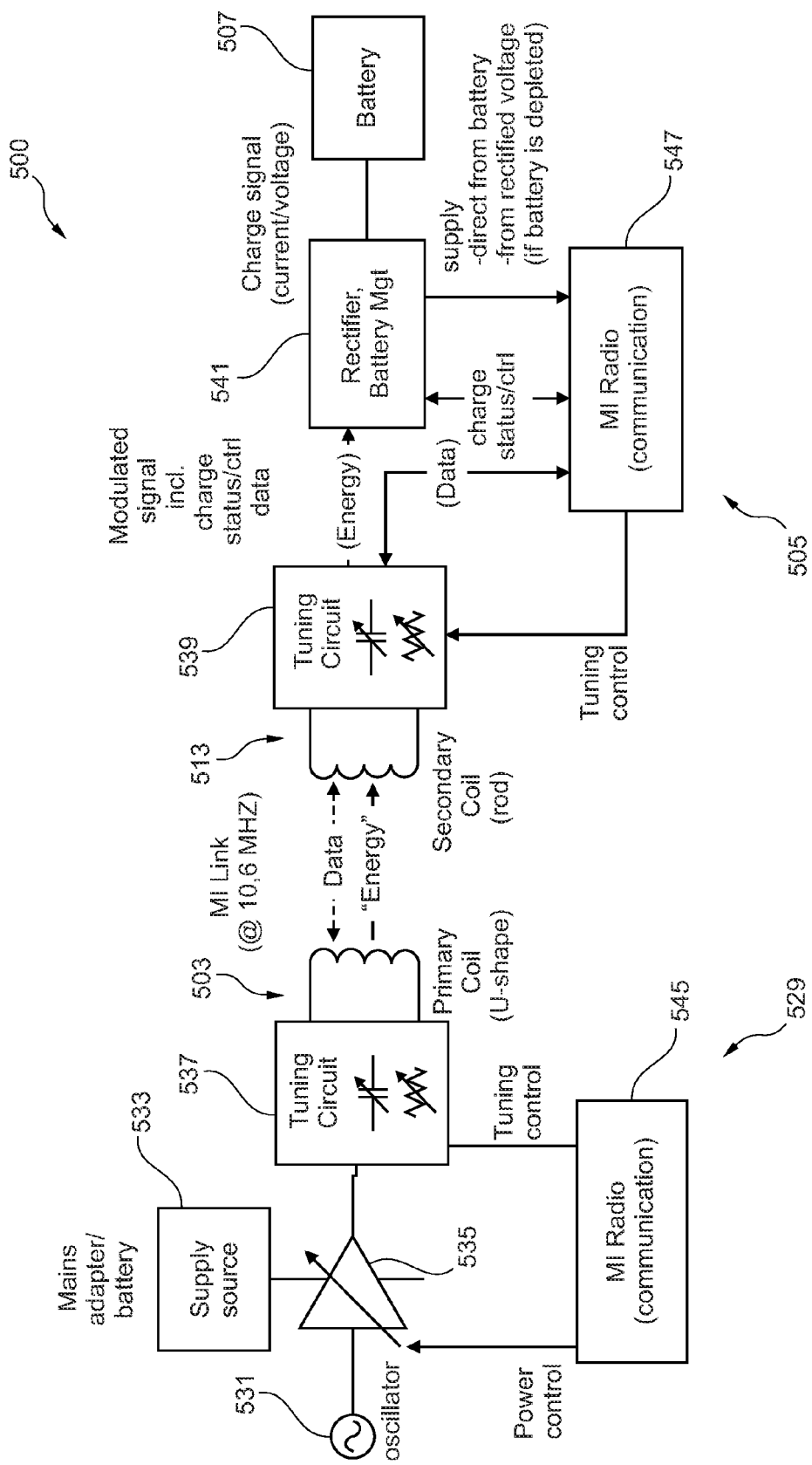
FIG. 5 schematically illustrates a further embodiment of a system for charging an electric accumulator.

FIG. 5 schematically shows another embodiment 500 of a system for charging an electric accumulator. The system 500 comprises a charger device 529 and a hearing instrument device 505 which share some similarities to the charger device 429 and the hearing instrument device 405 illustrated in FIG. 4, respectively. Additionally to the embodiment illustrated in FIG. 4 the system 500 illustrated in FIG. 5 allows a magnetic inductance (MI) radio communication between the charger device 529 and the hearing instrument device 505. Therefore, the charger device 529 comprises additionally to the charger device 429 illustrated in FIG. 4 a magnetic inductance radio communication module 545 which may provide a communication signal to the tuning circuit 537 which may supply the tuned communication signal to the further coil (or primary coil 503). Additional to transferring an energy signal the primary coil 503 is also adapted to transmit the communication signal to the hearing instrument device 505. Thus, the primary coil 503 may perform a double function (charging and communication).

Additionally to the hearing instrument 405 illustrated in FIG. 4 the hearing instrument device 505 illustrated in FIG. 5 comprises a magnetic inductance radio communication module 547 which may receive a communication signal via the secondary coil 513 and the tuning circuit 539 and which may also generate a communication signal to be transmitted via the tuning circuit and the secondary coil 513 to the charger device 529.

The smart charging subsystem 500 depicted in FIG. 5 has a short range communication link (MI radio). Note that most of the components in the charging subsystem (oscillator, variable gain amplifier, tuning circuit) are typically already part of the radio device in a conventional hearing device, and need not be duplicated. Only the rectifier and battery management are added. The short-range communication link enables the device 505 to communicate its power needs to the charger. According to the preferred embodiment, the charge procedure is implemented as follows:

The charger 529 is idle (not transmitting) by default

At regular time intervals, or responsive to a detection event (user button or mechanical detection), the charger 529 initiates a charge cycle with communication timeout (which will abort automatically if no device is present)

Charging exists of an (energy+optional data) transmission burst, followed by a short listening period, during which devices may respond with an energy demand request from the hearing instrument 505, resetting or reconfiguring the communication timeout and possibly (re)configuring the power level, until the device is fully charged. If the charger 529 does not receive a valid data packet, it decrements the timeout, eventually aborting the charge cycle.

Note that, because of charger-side initiation, the protocol is equally suitable for passive (battery-less) operation, which may also be applicable if the battery is fully depleted. The timeout must therefore be chosen to be at least as long as the device's time from power-up to first communication.

Figure 6A:
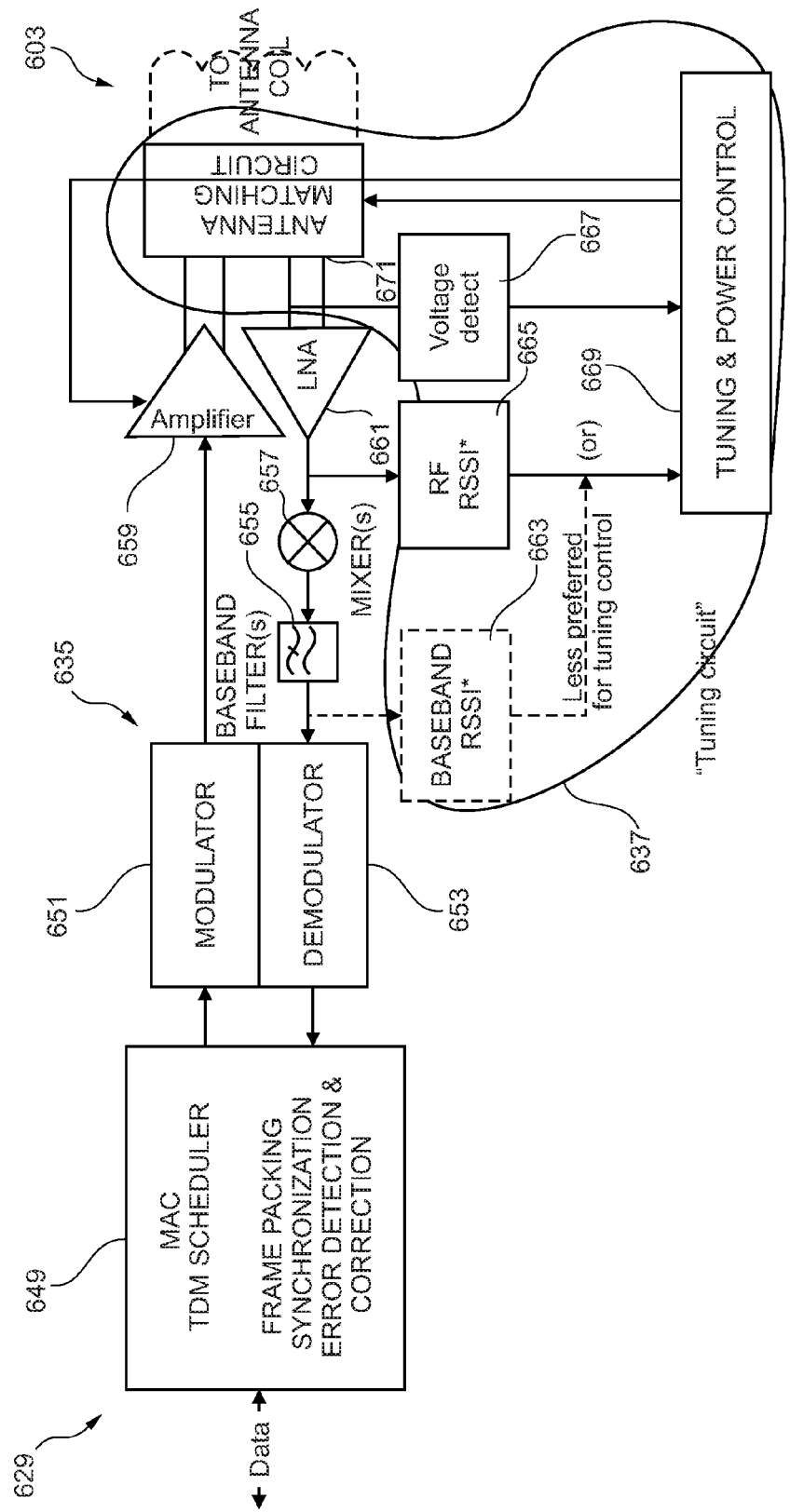
FIGS. 6A and 6B schematically illustrate a magnetic induction radio transceiver and signals generated therefrom according to an embodiment.

FIG. 6A schematically illustrates a magnetic induction radio transceiver 629 which may be used in an embodiment. According to an embodiment the magnetic induction radio transceiver 629 illustrated in FIG. 6 may be a charger device in a system for charging an electric accumulator according to an embodiment. The circuitry 635 comprises a MAC 649, a modulator 651, demodulator 653, a filter 655, a mixer 657, an amplifier 659 and a LNA 661 for generating a communication signal to be transmitted using the further coil 603 to a hearing instrument device not illustrated in FIG. 6. The tuning circuit 637 thereby comprises a baseband module 663, a radio frequency module 665, a voltage detection module 667 and a tuning and power control system 669 and an antenna matching circuit 671.

Figure 6B:
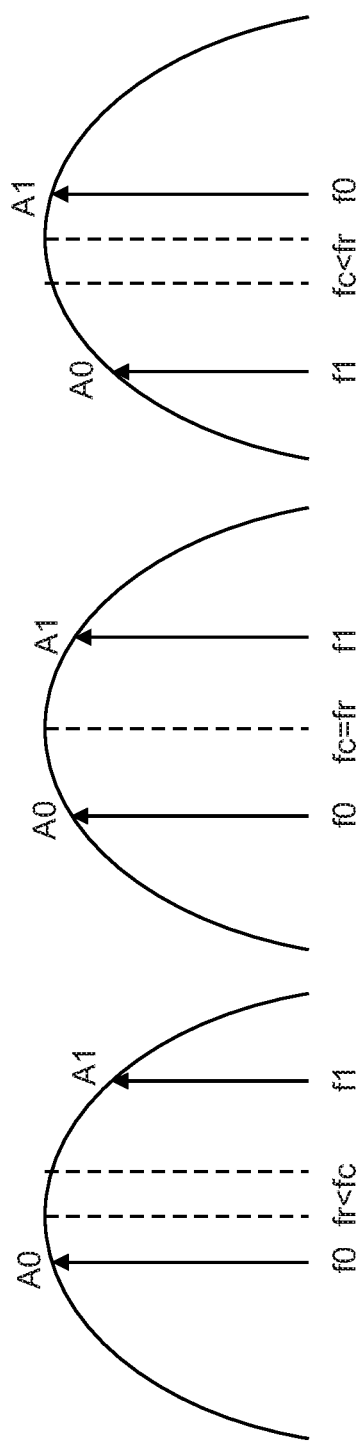

FIG. 6 details the magnetic induction (MI) radio transceiver, comprising a baseband processor (MAC TDM scheduler), modulator & demodulator, mixers, low noise input amplifier (LNA) with optional automatic gain control (not depicted) and variable gain output amplifier. The tuning circuit 637 includes an antenna matching circuit (capacitor & resistor bank) and control thereof in order to obtain resonant operation. This is typically achieved by measuring signal amplitude (voltage detection or received signal strength measurement) whilst transmitting each of the pure tones f0, f1 and fc. The differences in signal strength for f0 vs f1 tones represents the frequency detuning and is used to adjust the tuning capacitor; the difference of fc w.r.t. the average of f0 and f1 represents the bandwidth and is used to adjust the tuning resistor (Q), as illustrated in FIG. 6B.

The embodiments illustrated in FIGS. 7 and 8A to 8G below may also be used in the systems 400 and 500 for charging an electric accumulator according to an embodiment illustrated in FIG. 4 and FIG. 5, respectively and also in the magnetic induction radio transceiver 629 illustrated in FIG. 6A.

Figure 7:
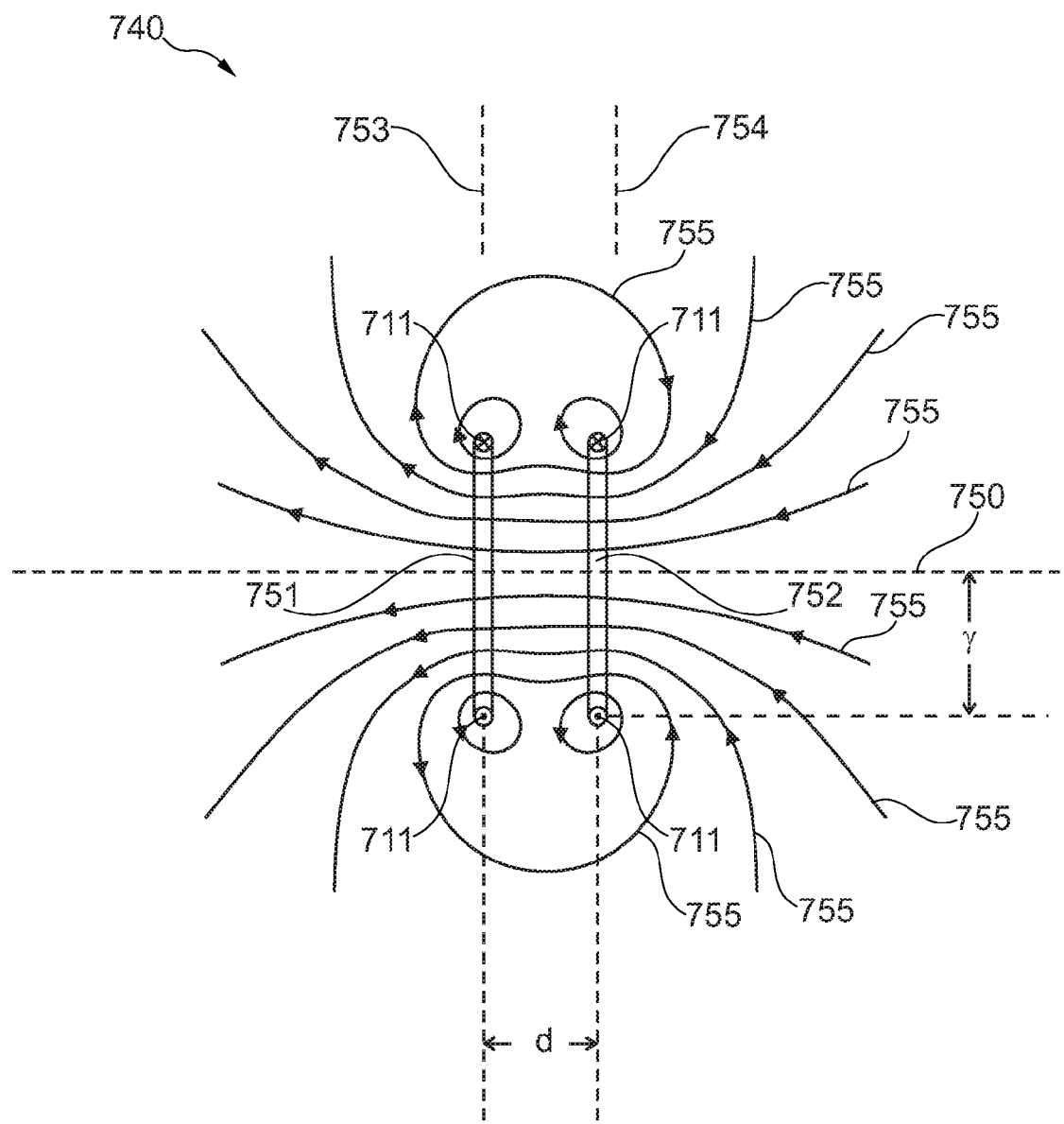
FIG. 7 schematically illustrates a plan view of a Helmholtz coil included in a charging station according to an embodiment.

FIG. 7 schematically illustrates a plan view of a Helmholtz coil included in a charging station according to an embodiment. A single further wire 711 (also referred to as primary wire) is wound around an axis 750 to form a first further coil 751 and a second further coil 752. The first further coil 751 extends in a plane 753 which is perpendicular to the winding axis 750 and the second further coil 752 extends in a plane 754 also perpendicular to the winding axis 750 such that the planes 753 and 754 are parallel to each other. In particular, the first further coil 751 has a same radius r as the second further coil 752, wherein in particular the radius r at least approximately equals a distance d between the first further coil 751 and the second further coil 752, when the distance d is taken along the winding axis 750.

FIG. 7 illustrates the situation, when an electric current flows through the further wire 711. Thus, the current flows through the first further coil 751 and the second further coil 752 connected in series to the first further coil 751. The current induces a magnetic field whose field lines are indicated by reference sign 755, wherein these field lines carry or are tagged with corresponding arrows to emphasize the vector character of the magnetic field lines 755. As can be seen, the magnetic field lines 755 surround the wire 711 in a region close to the wire 711. In contrast, in a region between the plates 753 and 754 and close to the winding axis 750 the magnetic field lines are almost parallel to each other and are also parallel to the winding axis 750. Further, the density of the magnetic field lines 755 is almost constant within this central region. Thus, a magnetic flux caused by the magnetic field lines 755 induced in a secondary coil of a hearing instrument (or any other device) to be charged is not strongly dependent on a position of the hearing instrument within the central region between the planes 753 and 754 close to the winding axis 750. Thus, charging an accumulator of the hearing instrument, such as the hearing instrument 105 illustrated in FIG. 1A or those illustrated in FIGS. 2A-2I or those illustrated in FIG. 4, 5 or 6 may be improved and facilitated.

The Helmholtz coil 740 illustrated in FIG. 7 is made up of two parallel coils 751 and 752, which are connected in series with a spacing d between them. Typically, for a Helmholtz coil, the spacing d between the two parallel coils 751 and 752 may be chosen to be at least approximately equal to the radius r of the two coils, as this may lead to an approximately uniform magnetic field in the above-defined central portion of the Helmholtz coil. Having a uniform magnetic field may be a desirable property, since it may ensure that the coupling factor between primary coil 740 and secondary coil (of the hearing instrument) may not be very sensitive to an exact relative positioning, but it is not essential for proper operation of the proposed overall system. Therefore, the distance d between both coils 751 and 752 may be considered as a design parameter that may be optimized for the specific mechanical design at hand.

In general, the magnetic subsystem may comprise one or more primary coils and one or more secondary coils. The secondary coil(s) may comprise a high permeability core material around which a conductor, such as a wire is wound. The primary coil (core) may be characterized by one or more Helmholtz coils. The secondary coil(s) may be positioned with a minimal "air" gap (as dictated by enclosures of the devices) between both coils constituting one Helmholtz coil.

According to an embodiment it may be envisaged that the Helmholtz coil is combined with a high permeability core material in the shape of a horseshoe or toroid with an air gap. This may have the advantage that the total magnetic field and hence the magnetic flux may increase due to the lower total magnetic impedance and that the stray fields may be lowered substantially (as they will be contained within the high permeability material) which may aid emitting the limits of the magnetic fields imposed by legislation or regulation.

FIGS. 8A, 8B, 8C schematically illustrate embodiments of a system 800 for charging an electric accumulator, wherein a single secondary device is arranged for charging its accumulator. In FIG. 8A a charging station comprises a further wire 811 which is wound such as to form a first further coil 851 and a second further coil 852 which together form a Helmholtz coil. In between the two further coils 851 and 852 the hearing instrument 805 is placed such that its wire 817 and its core 815 are placed between the first further coil 851 and the second further coil 852. Note, that the charging station does not comprise a core.

FIG. 8B illustrates a charging station comprising a further core 809 and a further wire 811 which is wound around the core to form a first further coil 851 and a second further coil 852. Thereby, the hearing instrument 805 is placed between the first further coil 851 and the second further coil 852.

FIG. 8C illustrates another embodiment of the system 800 for charging an electric accumulator, wherein the further core 809 has a toroid shape having a gap having the hearing instrument 805 placed in between ends of the toroid shaped further core 809.

FIGS. 8D, 8E, 8F and 8G illustrate further embodiments of a system 800 for charging an electric accumulator, wherein each charging station allows charging of two hearing instruments (dual charger variants).

In FIG. 8D the charging station comprises two further wires 811 and 811', each of which is wound to form a first further coil (851 and 851', respectively) and a second further coil (852 and 852', respectively). Thereby, two hearing instruments 805 and 805' are chargeable by a single charging station.

FIG. 8E illustrates a system 800 for charging an electric accumulator, wherein the charging station comprises a single further wire 811 which is wound to form a first further coil 851, a second further coil 852 and a third further coil 857 (all three further coils being connected in series), wherein between the first further coil 851 and the second further coil 852 a first hearing instrument 805 is placed and wherein between the second further coil 852 and the third further coil 857 a second hearing instrument 805' is placed to be charged.

FIG. 8F illustrates another embodiment of a system 800 for charging an electric accumulator, wherein a charging station comprises a single further wire 811 which is wound to form a first further coil 851 and a second further coil 852, wherein between the first further coil 851 and the second further coil 852 two hearing instruments 805 and 805' are placeable in series to be charged by the charging station.

FIG. 8G illustrates another embodiment of a system 800 for charging an electric accumulator, wherein the charging station comprises a single further wire 811 which is wound to form a first further coil 851 and a second further coil 852 between which two hearing instruments 805 and 805' are placeable, however not stacked along the winding axis 850 (in series) as in the embodiment illustrated in FIG. 8F, but arranged side by side spaced apart in a direction perpendicular to the winding axis 850 (in parallel).

According to an embodiment a single charging station may accommodate two hearing instruments or more hearing instruments. It may be most desirable to have distinct magnetic subsystems connected to distinct drivers that can be controlled individually, such that energy is only provided to a device that requires recharging (assuming for example a smart charger as illustrated in FIG. 5 or 6). For cost reasons, however, it may be more desirable to have a more basic charger with a single primary core. A variant based on series placement is shown in FIG. 8F but it may not be very attractive, because of degradation of the coupling efficiency. Another variant may be a parallel combination, where the hearing aids are placed side by side, as is illustrated in FIG. 8G. Further on the mechanical design of the charging station one may consider the variety of hearing instruments including behind the ear (BTE) instruments, in the ear (ITE) instruments and in the canal (ITC) instruments, it may be desirable to have a common charger station design, but specific plastic inserts/cups to hold each hearing instrument type or model, as to ensure proper hook up of the device and alignment of the magnetic subsystem.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

REFERENCE SIGNS

- 100,200,400,500 System for charging an electric accumulator
- 103,203,403,503,603 Further coil
- 105,205,405,505 Hearing instrument
- 107,407,507 Accumulator
- 111,211 Wire
- 113,213,413,513 Coil (secondary coil)
- 115,215 Core
- 117,217 Wire
- 119,219,121,221 Surface regions of the further core
- 325,327 Curves of the coupling coefficient k
- 431,531 Oscillator
- 433,533 Supply source
- 435,535 Circuitry
- 437,537 Tuning circuit
- 429,529,629 Charger device
- 439,539 Tuning circuit
- 441,541 Rectifier battery management module
- 545 Magnetic inductance radio communication module
- 547 Magnetic inductance radio communication module
- 649 MAC
- 651 Modulator
- 653 Demodulator
- 655 Baseband filter
- 657 Mixer
- 659 Amplifier
- 661 NAN
- 663 Baseband module
- 665 Radio frequency module
- 667 Voltage detect
- 669 Tuning and power control
- 671 Antenna matching circuit

The invention claimed is:

1. An apparatus comprising:
    an accumulator configured and arranged to store electric charge;
    audio amplification circuit configured to amplify an audio signal using energy stored in the accumulator;
    a core;
    a wire wound around the core in a coil, wherein the coil is adapted to receive energy from a magnetic field;
    a tuning circuit configured and arranged to
        align a resonance frequency for transmission on the wire, in response to an increased energy demand based on an amount of electric charge stored in the accumulator and based upon differences in signal strengths for two tones surrounding the resonance frequency, with a frequency of the magnetic field to increase the energy received from the magnetic field, and
        adjust, in response to a decreased energy demand based on the amount of electric charge stored in the accumulator, the resonance frequency of the wire away from the frequency of the magnetic field to decrease the energy received from the magnetic field; and
    a communication circuit having
        a modulator circuit configured to modulate a radio frequency (RF) signal according to information indicative of energy demand corresponding to an amount of electric charge stored in the accumulator, and
        an amplifier circuit configured and arranged to amplify the RF signal and provide the amplified RF signal to the wire for wireless transmission,
    wherein the wire is configured and arranged to connect to the accumulator and to transfer the received energy to the accumulator.

2. The apparatus according to claim 1, wherein the RF signal and the magnetic field have about the same frequency.

3. The apparatus according to claim 1, wherein the core has a rod shape, wherein the core has an extent between 1 mm and 15 mm, and the communication circuit is further configured and arranged to transmit the signal indicative of an energy demand in the absence of the magnetic field as provided by an external charging controller.

4. The apparatus according to claim 1, wherein the core has a permeability greater than 30.

5. The apparatus according to claim 1, further comprising a charging controller including a rectifier, wherein the wire is connectable to the accumulator at least via the charging controller.

6. The apparatus according to claim 1, wherein the communication circuit includes a near-field communication system connectable to the wire, and
    wherein the apparatus is configured to selectively connect at least one of the accumulator and the near-field communication system to the wire.

7. The apparatus according to claim 6, wherein the near-field communication system is adapted to generate the signal indicative of an energy demand of the accumulator, the coil being configured and arranged to transmit the signal indicative of an energy demand of the accumulator and receive a magnetic field associated with the indicated energy demand of the accumulator.

8. The apparatus according to claim 1, further comprising an audio amplification system for amplifying an audio signal using energy stored in the accumulator.

9. The apparatus according to claim 1, wherein the communication circuit includes a near-field communication circuit configured and arranged to generate a signal indicative of the energy demand of the accumulator and transmit the signal via the coil, further including an amplification circuit configured and arranged to amplify a received audio signal using energy stored in the accumulator, and a charging station configured and arranged to receive the signal indicative of an energy demand of the accumulator, and to charge the accumulator by supplying a magnetic field to the coil based on the energy demand of the accumulator.

10. A system for charging an electric accumulator, the system comprising:
an apparatus including
an accumulator configured and arranged to store electric charge,
a core,
audio amplification circuit configured to amplify an audio signal using energy stored in the accumulator;
a wire coil wound around the core and connected to the accumulator, the wire being configured and arranged to collect energy from a magnetic field and to transfer the collected energy to the accumulator, the accumulator being configured and arranged to store the transferred energy as the electric charge,
a tuning circuit configured and arranged to
align a resonance frequency for transmission on the wire coil, in response to an increased energy demand based on an amount of electric charge stored in the accumulator and based upon differences in signal strengths for two tones surrounding the resonance frequency, with a frequency of the magnetic field to increase the energy received from the magnetic field, and
adjust, in response to a decreased energy demand based on the amount of electric charge stored in the accumulator, the resonance frequency of the wire coil away from the frequency of the magnetic field to decrease the energy received from the magnetic field; and
a communication circuit configured and arranged to control the magnetic field by generating a signal indicative of an energy demand based on an amount of electric charge stored in the accumulator; and a charging station for generating the magnetic field for transferring energy to the accumulator, the charging station comprising:
a further wire wound such as to form a further coil, the further wire being connectable to an electric energy source for generating a magnetic field,
a further core around which the further wire is wound, the further core comprising a first surface region and a second surface region opposite to the first surface region, the first surface region and the second surface regions being configured to form regions of enhanced density of magnetic flux, relative to magnetic flux at other surface regions of the further core, and
wherein the apparatus and the charging station are configured and arranged relative to each other such that the magnetic field generated by the further coil induces a current in the wire thereby transferring energy from the charging station to the apparatus for transferring energy.

11. The system according to claim 10, wherein the further core has one of a U-shape, a horse-shoe shape, and a toroid shape.

12. The system according to claim 11, wherein the further core comprises a material having a relative magnetic permeability greater than 30.

13. The system according to claim 11,
wherein the charging station and the apparatus are arrangeable such that the core is arranged between the first surface region and the second surface region.

14. The system according to claim 11,
wherein a distance between a first end of the core and a first surface region of the further core is between 0 mm and 20 mm, and
wherein a distance between a second end of the core, the second end of the core being opposite to the first end of the core, and a second surface region of the further core is between 0 mm and 20 mm.

* * * * *